(12) United States Patent
Hao et al.

(10) Patent No.: US 11,851,331 B2
(45) Date of Patent: Dec. 26, 2023

(54) DIRECTIONALLY-ARRANGED GRAPHENE HEAT-CONDUCTING FOAM, DIRECTIONALLY-ARRANGED GRAPHENE HEAT-CONDUCTING FILM, PREPARATION METHODS OF DIRECTIONALLY-ARRANGED GRAPHENE HEAT-CONDUCTING FOAM AND DIRECTIONALLY-ARRANGED GRAPHENE HEAT-CONDUCTING FILM, AND ELECTRONIC PRODUCT

(71) Applicant: GUANGDONG MORION NANOTECHNOLOGY CO., LTD., Guangdong (CN)

(72) Inventors: Zhenliang Hao, Guangdong (CN); Jinming Cai, Guangdong (CN)

(73) Assignee: GUANGDONG MORION NANOTECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/044,608

(22) PCT Filed: Jun. 23, 2022

(86) PCT No.: PCT/CN2022/100773
§ 371 (c)(1),
(2) Date: Mar. 9, 2023

(87) PCT Pub. No.: WO2023/060933
PCT Pub. Date: Apr. 20, 2023

(65) Prior Publication Data
US 2023/0242403 A1    Aug. 3, 2023

(30) Foreign Application Priority Data

Oct. 14, 2021 (CN) .......................... 202111197031.7

(51) Int. Cl.
*C01B 32/184* (2017.01)
*H05B 3/14* (2006.01)

(52) U.S. Cl.
CPC ............ *C01B 32/184* (2017.08); *H05B 3/145* (2013.01)

(58) Field of Classification Search
CPC ... C01B 32/184; C01B 32/182; C01B 32/186; C01B 32/188; C01B 32/19;
(Continued)

(56) References Cited

U.S. PATENT DOCUMENTS

2017/0178824 A1* 6/2017 Kaner .................. C01B 32/198

FOREIGN PATENT DOCUMENTS

| CN | 106967392 A | 7/2017 |
|---|---|---|
| CN | 107010618 A | 8/2017 |

(Continued)

OTHER PUBLICATIONS

Shao, et al., 3D Freeze-Casting of Cellular Graphene Films for Ultrahigh-Power-Density Supercapacitors, Advanced Materials 2016; 28: 6719-6726 (Year: 2016).*

(Continued)

*Primary Examiner* — Daniel C. McCracken
(74) *Attorney, Agent, or Firm* — ZIEGLER IP LAW GROUP LLC (57) ABSTRACT

Provided is directionally-arranged graphene heat-conducting foam, directionally-arranged graphene heat-conducting film, preparation methods of the directionally-arranged graphene heat-conducting foam and the directionally-arranged graphene heat-conducting film, and an electronic product. For the preparation method of graphene heat-conducting foam, after part of the graphene oxide slurry is preliminarily directionally molded in freezing condition with an array grid with specific structure and tank, the array grid is separated from the part of the graphene oxide slurry, to obtain the first graphene oxide, then the other part of the graphene oxide slurry is injected to gaps and an upper surface of the first
(Continued)

graphene oxide, then the graphene oxide slurry is frozen and dried, to obtain second graphene oxide, and finally, the carbonization and graphitization treatment is performed on the second graphene oxide, to obtain the directionally-arranged graphene heat-conducting foam. Graphene heat-conducting film is prepared by pressing the above graphene heat-conducting foam.

13 Claims, 4 Drawing Sheets

(58) Field of Classification Search
CPC ... C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; H05B 3/145
See application file for complete search history.

(56) References Cited

FOREIGN PATENT DOCUMENTS

| CN | 108431918 A | 8/2018 |
|---|---|---|
| CN | 108842131 A | 11/2018 |
| CN | 110342497 A | 10/2019 |
| CN | 110697692 A | 1/2020 |
| CN | 110804420 A | 2/2020 |
| CN | 112225204 A | 1/2021 |
| CN | 113697800 A | 11/2021 |

OTHER PUBLICATIONS

Shabizi, et al., Directional Freeze-Casting: A Bioinspired Method to Assemble Multifunctional Aligned Porous Structures for Advanced Applications, Advanced Engineering Materials 2020; 22: 2000033, pp. 1-26 (Year: 2020).*
China National Intellectual Property Administration, Search Report, Patent Application No. 2021111970317, dated Feb. 23, 2022, 2pages.
China National Intellectual Property Administration, Search Report, Supplementary Search, Patent Application No. 2021111970317, dated Mar. 23, 2022, 2 pages.
ISA/CN, International Search Report, Application No. PCT/CN2022/100773, dated Sep. 1, 2022, 5 pages.
ISA/CN, Written Opinion of the International Searching Authority, Application No. PCT/CN2022/100773, dated Sep. 1, 2022, 5 pages.
Royal Society of Chemistry, Jinming Cai et al., J. Mater.Chem. C, 2021, 9, 8849, Multiple functional base-induced highly ordered graphene aerogels; rsc.li/materials-c, pp. 8849-8854, 7 pages.
The State Intellectual Property Office of People's Republic of China, First Office Action; Application No. 202111197031.7; dated Mar. 3, 2022, 3 pages.
The State Intellectual Property Office of Peoples Republic of China, Notification to Grant Patent Right for Invention, Application No. 202111197031.7, dated Mar. 23, 2022, 1 page.

* cited by examiner

DIRECTIONALLY-ARRANGED GRAPHENE HEAT-CONDUCTING FOAM, DIRECTIONALLY-ARRANGED GRAPHENE HEAT-CONDUCTING FILM, PREPARATION METHODS OF DIRECTIONALLY-ARRANGED GRAPHENE HEAT-CONDUCTING FOAM AND DIRECTIONALLY-ARRANGED GRAPHENE HEAT-CONDUCTING FILM, AND ELECTRONIC PRODUCT

CROSS-REFERENCE TO RELATED APPLICATION

The present disclosure claims the priority to the Chinese patent application with the filing No. CN202111197031.7 filed with the Chinese Patent Office on Oct. 14, 2021, and entitled "Directionally-arranged Graphene Heat-conducting Foam, Directionally-arranged Graphene Heat-conducting Film, Preparation Methods of Directionally-arranged Graphene Heat-conducting Foam and Directionally-arranged Graphene Heat-conducting Film, and Electronic Product", the contents of which are incorporated herein by reference in entirety.

TECHNICAL FIELD

The present disclosure relates to the technical field of heat-conducting materials, in particular to a directionally-arranged graphene heat-conducting foam, a directionally-arranged graphene heat-conducting film, a preparation method of the directionally-arranged graphene heat-conducting foam and a preparation method of the directionally-arranged graphene heat-conducting film, and an electronic product.

BACKGROUND ART

With the advent of the 5G era, electronic device designs have developed towards lightness and thinness, intelligence, and multi-functionalization. Such multi-functionalization electronic devices necessarily involve data collection, transmission, and storage. The electronic device needs to transmit more data information at a time, has a faster transmission speed, also generates more heat, and the requirement for the heat dissipation performance of the device is also higher. For example, the heat dissipation demand of a 5G mobile phone differs from that of a 4G mobile phone as follows: 1) the processor performance is greatly improved, and some processors adopt a design of external plug-in 5G baseband, so that the power consumption is greatly improved; 2) the screen has a high resolution and a high refresh rate, and the power consumption is increased; and 3) more antennas are built-in, and the signal is searched frequently when the 5G signal is weak, thus having higher power consumption and heat generation. However, the existing heat-conducting materials cannot meet the heat dissipation requirement of the 5G electronic products gradually.

Graphene is a carbon material widely studied at present, and the theoretical thermal conductivity coefficient of single-layer graphene can be up to 5300 W/(m·K). To prepare a high-performance heat-conducting product with the graphene, an excellent heat-conducting material, has great significance for solving existing heat dissipation problems. However, the graphene heat-conducting film manufactured by the existing preparation method has a certain transverse thermal conductivity but a poor longitudinal thermal conductivity, which cannot meet a practical performance requirement of the graphene heat-conducting film.

SUMMARY

The present disclosure provides a preparation method of a directionally-arranged graphene heat-conducting foam.

The present disclosure provides a directionally-arranged graphene heat-conducting foam, prepared by the above preparation method.

The present disclosure provides a preparation method of a directionally-arranged graphene heat-conducting film, wherein the directionally-arranged graphene heat-conducting film prepared by this preparation method not only has a relatively high in-plane thermal conductivity coefficient, but also has a relatively high longitudinal thermal conductivity coefficient.

The present disclosure provides a directionally-arranged graphene heat-conducting film, prepared by the above method.

The present disclosure provides an electronic product, including the above directionally-arranged graphene heat-conducting film.

The present disclosure provides a preparation method of a directionally-arranged graphene heat-conducting foam, including steps of:

(a) injecting a part of a graphene oxide slurry into a tank containing an array grid, and taking out the array grid from the tank when the graphene oxide slurry is frozen to have no fluidity, to obtain a first graphene oxide;

(b) injecting the other part of the graphene oxide slurry into gaps left in the first graphene oxide after the array grid is taken out and an upper surface, freezing the graphene oxide slurry again until the graphene oxide slurry has no fluidity, and then drying to obtain a second graphene oxide; and (c) performing carbonization and graphitization treatment on the second graphene oxide, to obtain a directionally-arranged graphene heat-conducting foam.

In some embodiments, on the basis of the above technical solution of the present disclosure, in step (a), the array grid is provided with several microscopic through-holes, a bottom surface of the array grid has a certain distance from a bottom surface of the tank, and the microscopic through-holes can make the graphene oxide slurry pass through and flow to the bottom of the tank.

In some embodiments, in step (a), the height of the tank is greater than or equal to the height of the array grid.

In some embodiments, on the basis of the above technical solution of the present disclosure, in step (a), a solid content of the part of the graphene oxide slurry is 0.1-10%. In some embodiments, the solid content of the part of the graphene oxide slurry is 5%.

In some embodiments, in step (a), a freezing temperature is −5~−150° C., and freezing time is 1-3 h.

In some embodiments, on the basis of the above technical solution of the present disclosure, in step (b), a solid content of the other part of the graphene oxide slurry is 0.1-10%. In some embodiments, the solid content of the other part of the graphene oxide slurry is 5%.

In some embodiments, in step (b), a re-freezing temperature is −5~−150° C., and re-freezing time is 1-3 h.

In some embodiments, on the basis of the above technical solution of the present disclosure, in step (c), a temperature of the carbonization treatment is 1000-2000° C., heat preservation time is 1-2 h, and a heating rate is 1-5° C./min.

In some embodiments, in step (c), a temperature of the graphitization treatment is 2300-3300° C., heat preservation time is 4-20 h, and a heating rate is 0.5-1° C./min.

The present disclosure further provides a directionally-arranged graphene heat-conducting foam, prepared by the above preparation method of a directionally-arranged graphene heat-conducting foam, wherein at least a part of the graphene in the graphene heat-conducting foam is arranged in a direction perpendicular to a thickness direction of the graphene heat-conducting foam so as to form parallel layers close to surfaces of two sides of the graphene heat-conducting foam, respectively, and at least a part of the graphene is arranged along a thickness direction of the graphene heat-conducting foam between the parallel layers.

In some embodiments, a thickness of the graphene heat-conducting foam is 0.01 to 100 mm.

In some embodiments, a density of the graphene heat-conducting foam is 0.002-1.0 g/cm$^3$.

In some embodiments, the graphene heat-conducting foam has an in-plane thermal conductivity coefficient of 1-200 W/(m·K), and a longitudinal thermal conductivity coefficient of 1-10 W/(m·K).

The present disclosure further provides a preparation method of a directionally-arranged graphene heat-conducting film, including a step of:

pressing the above directionally-arranged graphene heat-conducting foam to obtain the directionally-arranged graphene heat-conducting film.

In some embodiments, on the basis of the above technical solution of the present disclosure, a pressing pressure is 10-200 MPa.

The present disclosure further provides a directionally-arranged graphene heat-conducting film, prepared by the above preparation method of a directionally-arranged graphene heat-conducting film;

at least a part of the graphene in the graphene heat-conducting film is arranged in a direction perpendicular to a thickness direction of the graphene heat-conducting film so as to form parallel layers close to surfaces of two sides of the graphene heat-conducting film, respectively, and at least a part of the graphene is arranged at an acute angle with the thickness direction of the graphene heat-conducting film between the parallel layers.

In some embodiments, a thickness of the graphene heat-conducting film is 0.005-1 mm.

In some embodiments, a density of the graphene heat-conducting film is 1.0-2.3 g/cm$^3$.

In some embodiments, the graphene heat-conducting film has an in-plane thermal conductivity coefficient of 500-2000 W/(m·K), and a longitudinal thermal conductivity coefficient of 400-1500 W/(m·K).

The present disclosure further provides an electronic product, containing the above directionally-arranged graphene heat-conducting film.

In some embodiments, the electronic product includes 5G mobile terminals.

Compared with the prior art, the present disclosure has the following technical effects.

(1) The present disclosure provides a preparation method of a directionally-arranged graphene heat-conducting foam. After a part of the graphene oxide slurry is preliminarily directionally molded in a freezing condition with the grid array with a specific structure and the tank, the grid array is separated from the part of the graphene oxide slurry, to obtain the first graphene oxide, then the other part of the graphene oxide slurry is injected to the gaps and the upper surface of the first graphene oxide, then the graphene oxide slurry is frozen, to obtain the second graphene oxide, and finally, the carbonization and graphitization treatment is performed on the second graphene oxide, to obtain the directionally-arranged graphene heat-conducting foam.

This preparation method has strong controllability and is convenient to operate, the graphene heat-conducting foam prepared by this preparation method has a unique structure, that is, at least a part of the graphene in the graphene heat-conducting foam is arranged in a direction perpendicular to a thickness direction of the graphene heat-conducting foam so as to form parallel layers close to surfaces of two sides of the graphene heat-conducting foam, respectively, and at least a part of the graphene is arranged along the thickness direction of the graphene heat-conducting film between the parallel layers.

(2) The present disclosure provides a directionally-arranged graphene heat-conducting foam, prepared by the above preparation method of a graphene heat-conducting foam. In view of the specific steps of the above preparation method, the graphene heat-conducting foam is allowed to have a unique structure, that is, at least a part of the graphene in the graphene heat-conducting foam is arranged in a direction perpendicular to a thickness direction of the graphene heat-conducting foam so as to form parallel layers close to surfaces of two sides of the graphene heat-conducting foam, respectively, and at least a part of the graphene is arranged along the thickness direction of the graphene heat-conducting film between the parallel layers, and this structure also provides a foundation for subsequently preparing a directionally-arranged graphene heat-conducting film.

(3) The present disclosure provides a preparation method of a directionally-arranged graphene heat-conducting film, prepared by pressing the above directionally-arranged graphene heat-conducting foam. This preparation method is convenient to operate and has strong controllability, the graphene heat-conducting film prepared by this preparation method has a unique structure, that is, at least a part of the graphene in the graphene heat-conducting film is arranged in a direction perpendicular to a thickness direction of the graphene heat-conducting film so as to form parallel layers close to surfaces of two sides of the graphene heat-conducting film, respectively, and at least a part of the graphene is arranged at an acute angle with the thickness direction of the graphene heat-conducting film between the parallel layers. The above structure makes the graphene heat-conducting film not only have a relatively high in-plane thermal conductivity coefficient, but also have a relatively high longitudinal thermal conductivity coefficient.

(4) The present disclosure provides a directionally-arranged graphene heat-conducting film, prepared by the above preparation method of a graphene heat-conducting film. In view of the specific steps of the above preparation method, the graphene heat-conducting film is allowed to have a unique structure, and the above unique structure enables the graphene heat-conducting film to not only have a relatively high in-plane thermal conductivity coefficient, but also have a relatively high longitudinal thermal conductivity coefficient.

(5) The present disclosure further provides an electronic product, containing the above directionally-arranged graphene heat-conducting film. In view of the advantages of the above graphene heat-conducting film, the electronic product also has the same advantages.

BRIEF DESCRIPTION OF DRAWINGS

In order to more clearly illustrate the technical solutions in specific embodiments of the present disclosure or in the prior art, drawings which need to be used in the description of the specific embodiments or the prior art will be introduced briefly below, and apparently, the drawings in the description below merely show some embodiments of the present disclosure, and those ordinarily skilled in the art still could obtain other drawings in light of these drawings without any creative effort.

Reference signs: 100—array grid; 101—microscopic through-hole; 102—bracket; 200—tank.

DETAILED DESCRIPTION OF EMBODIMENTS

In order to make objectives, technical solutions, and advantages of the embodiments of the present disclosure clearer, the technical solutions in the embodiments of the present disclosure will be described clearly and completely below in conjunction with the drawings in the embodiments of the present disclosure, and apparently, some but not all embodiments of the present disclosure are described. Generally, components in the embodiments of the present disclosure described and shown in the drawings herein may be arranged and designed in various different configurations.

In the description of the present disclosure, it should be noted that orientation or positional relationships indicated by terms such as "upper" and "inner" are based on orientation or positional relationships as shown in the drawings, or orientation or positional relationships of an inventive product when being conventionally placed in use, merely for facilitating describing the present disclosure and simplifying the description, rather than indicating or suggesting that related apparatuses or elements have to be in the specific orientation or configured and operated in a specific orientation, therefore, they should not be construed as limitation on the present disclosure. Besides, terms such as "first" and "second" are merely used for distinguishing the description, but should not be construed as indicating or implying importance in the relativity.

In the description of the present disclosure, it should also be noted that, unless clearly defined and limited otherwise, the terms "provide" and "connect" should be understood in a broad sense, for example, it may be a fixed connection, a detachable connection, or an integral connection; it can be a mechanical connection or an electrical connection; it can be a direct connection, or an indirect connection through an intermediary, and it can be internal communication between two components. The specific meanings of the above-mentioned terms in the present disclosure could be understood by a person ordinarily skilled in the art according to specific situations.

The present disclosure provides a preparation method of a directionally-arranged graphene heat-conducting foam, including the following steps:

(a) injecting a part of a graphene oxide slurry into a tank containing an array grid, and taking out the array grid from the tank when the graphene oxide slurry is frozen to have no fluidity, to obtain a first graphene oxide;

(b) injecting the other part of the graphene oxide slurry into gaps left in the first graphene oxide after the array grid is taken out and an upper surface, freezing again until the graphene oxide slurry has no fluidity, and then drying to obtain a second graphene oxide; and (c) performing carbonization and graphitization treatment and optional pressing on the second graphene oxide, to obtain the directionally-arranged graphene heat-conducting foam.

Specifically, in step (a), the graphene oxide slurry refers to a mixed slurry formed by graphene oxide and water.

The array grid refers to a device having a plurality of microscopic through-holes for directionally molding the graphene oxide slurry in a freezing condition.

The array grid is placed in the tank, and after a part of the graphene oxide slurry is injected into the tank, the graphene oxide slurry flows o the bottom of the tank and the microscopic through-holes of the array grid. After the freezing treatment is performed on the graphene oxide slurry, the graphene oxide slurry gradually tends to solidify. When the graphene oxide slurry has no fluidity, the array grid can be taken out from the tank so that the array grid is separated from the graphene oxide slurry, to obtain the first graphene oxide. In this case, the gaps left after the array grid is taken out are formed on the first graphene oxide.

In step (b), the other part of the graphene oxide slurry is injected into the gaps and the upper surface of the first graphene oxide, to ensure that the upper surface of the first graphene oxide is completely covered by the other part of the graphene oxide slurry. The graphene oxide slurry is frozen again until the other part of the graphene oxide slurry has no fluidity, and the graphene oxide slurry is dried to remove moisture, facilitating subsequent carbonization and graphitization, to obtain the second graphene oxide.

In the step (c), the second graphene oxide is taken out from the tank, to undergo carbonization, so that oxygen and hydrogen elements in the second graphene oxide are reduced, the graphitization treatment is performed after the carbonization treatment, so that graphene sheet layers are combined with each other to form bonding, and the directionally-arranged graphene heat-conducting foam is obtained.

In the preparation method of a graphene heat-conducting foam provided in the present disclosure, after a part of the graphene oxide slurry is preliminarily directionally molded in a freezing condition with the grid array with a specific structure and the tank, the grid array is separated from the part of the graphene oxide slurry, to obtain the first graphene oxide, then the other part of the graphene oxide slurry is injected to the gaps and the upper surface of the first graphene oxide, then the graphene oxide slurry is frozen, to obtain the second graphene oxide, and finally, the carbonization and graphitization treatment is performed on the second graphene oxide, to obtain the directionally-arranged graphene heat-conducting foam.

This preparation method has strong controllability and is convenient to operate, the graphene heat-conducting foam prepared by this preparation method has a unique structure, that is, at least a part of the graphene in the graphene heat-conducting foam is arranged in a direction perpendicular to a thickness direction of the graphene heat-conducting foam so as to form parallel layers close to surfaces of two sides of the graphene heat-conducting foam, respectively, and at least a part of the graphene is arranged along the thickness direction of the graphene heat-conducting foam between the parallel layers.

It should be further noted that the graphene in the graphene heat-conducting foam located between the parallel layers being arranged along the thickness direction of the graphene heat-conducting foam can also be understood as being arranged in a direction perpendicular to the parallel layers.

The grid array and the tank are devices for primarily directionally molding the graphene oxide slurry in a freezing condition, so that the structures thereof are limited to a certain extent.

Figure 1:
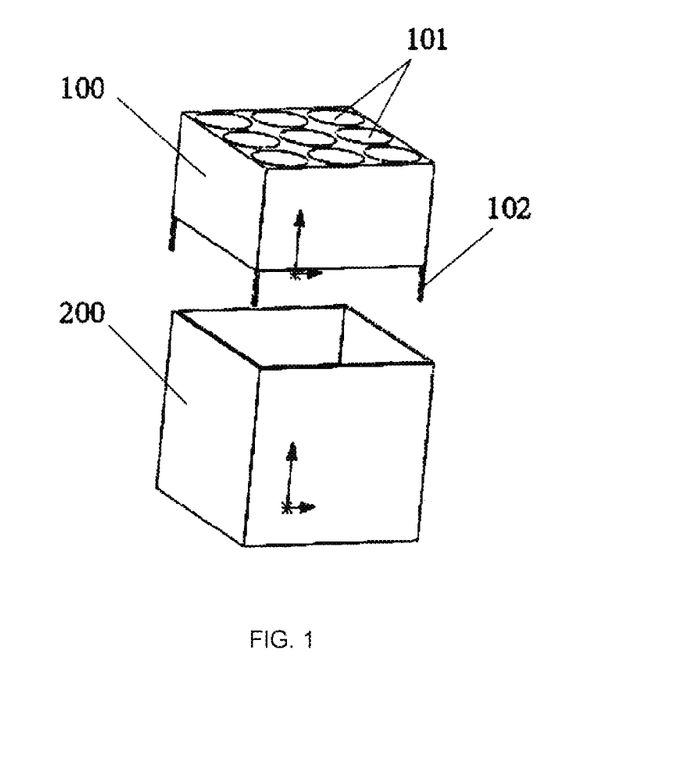
FIG. 1 is a structural diagram of an array grid and a tank in an embodiment of the present disclosure.
Figure 2:
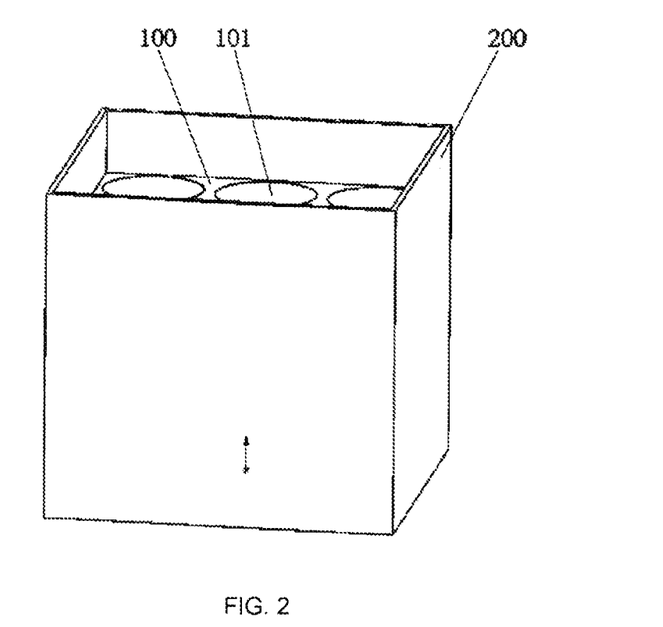
FIG. 2 is a structural diagram of an array grid and a tank in another embodiment of the present disclosure.

As an optional embodiment of the present disclosure, in step (a), the array grid 100 is provided with several microscopic through-holes 101, the bottom surface of the array grid 100 has a certain distance from the bottom surface of the tank 200, and the microscopic through-holes 101 can make the graphene oxide slurry pass through and flow to the bottom of the tank 200, specifically as shown in FIG. 1 and FIG. 2.

The number of microscopic through-holes 101 is not particularly limited, and can be selected according to a desired structure of the graphene heat-conducting film. The shape of the microscopic through-holes 101 is not particularly limited, either, for example, the shape may be at least one or a combination of a circular shape, a rectangular shape, a diamond, or a polygonal shape.

The bottom of the tank 200 refers to an area within the tank near the bottom surface.

The bottom surface of the array grid 100 has a certain distance from the bottom surface of the tank 200, and with such design, the graphene oxide slurry can be made to flow to the bottom of the tank 200 so as to facilitate subsequent formation of parallel layers in the graphene heat-conducting film.

In order to ensure that the bottom surface of the array grid 100 has a certain distance from the bottom surface of the tank 200, as an alternative embodiment of the present disclosure, a bracket 102 is provided on the bottom surface of the array grid 100, and the bracket 102 may be fixedly connected or detachably connected with the array grid 100.

As an optional embodiment of the present disclosure, in step (a), the tank 200 is open at the top, and the height of the tank 200 is greater than or equal to the height of the array grid 100.

The shape of the tank 200 is not specifically limited, for example, the shape may be a rectangular shape, a circular shape, or the like, and the size of the tank may be customized according to use requirement.

The height of the tank herein refers to height from the bottom surface of the tank to the opening at the top end.

As an optional embodiment of the present disclosure, the height of the tank is 0.005 mm-100 mm.

As an optional embodiment of the present disclosure, the height of the array grid is 0.005 mm-100 mm.

As an optional embodiment of the present disclosure, in step (a), a freezing temperature is −5~−150° C., and freezing time is 1-3 h. A typical but non-limiting freezing temperature is −5° C., −10° C., −20° C., −30° C., −40° C., −50° C., −60° C., −70° C., −80° C., −90° C., −100° C., −110° C., −120° C., −130° C., −140° C., or −150° C., and typical but non-limiting freezing time is 1 h, 1.5 h, 2.0 h, 2.5 h or 3.0 h.

As an optional embodiment of the present disclosure, in step (b), a re-freezing temperature is −5~−150° C., and freezing time is 1-3 h. A typical but non-limiting re-freezing temperature is −5° C., −10° C., −20° C., −30° C., −40° C., −50° C., −60° C., −70° C., −80° C., −90° C., −100° C., −110° C., −120° C., −130° C., −140° C., or −150° C., and typical but non-limiting re-freezing time is 1 h, 1.5 h, 2.0 h, 2.5 h or 3.0 h.

As an optional embodiment of the present disclosure, in step (c), a temperature of the carbonization treatment is 1000-2000° C., heat preservation time is 1-2 h, and a heating rate is 1-5° C./min.

A typical but non-limiting temperature of the carbonization treatment is 1000° C., 1200° C., 1400° C., 1500° C., 1600° C., 1800° C. or 2000° C. Typical but non-limiting heat preservation time is 1 h, 1.5 h or 2 h. A typical but non-limiting heating rate is 1° C./min, 2° C./min, 3° C./min, 4° C./min, or 5° C./min.

As an optional embodiment of the present disclosure, in step (c), a temperature of the graphitization treatment is 2300-3300° C., heat preservation time is 4-20 h, and a heating rate is 0.5-1° C./min.

A typical but non-limiting temperature of the graphitization treatment is 2300° C., 2500° C., 2800° C., 3000° C., 3200° C. or 3300° C. Typical but non-limiting heat preservation time is 4 h, 5 h, 6 h, 8 h, 10 h, 12 h, 15 h, 16 h, 18 h, or 20 h. A typical but non-limiting heating rate is 0.5° C./min, 0.6° C./min, 0.8° C./min, or 1.0° C./min.

As an optional embodiment of the present disclosure, in step (a) and step (b), a solid content of a part of the graphene oxide slurry and a solid content of the other part of the graphene oxide slurry are 0.1-10%, optionally 5%, respectively. A typical but non-limiting solid content of a part of the graphene oxide slurry and the other part of the graphene oxide slurry is 0.1%, 0.5%, 1%, 2%, 3%, 4%, 5%, 6%, 7%, 8%, 9%, or 10%.

The present disclosure further provides a directionally-arranged graphene heat-conducting foam, prepared by the above preparation method of a directionally-arranged graphene heat-conducting foam.

In view of the specific steps of the above preparation method, the graphene heat-conducting foam is allowed to have a unique structure, that is, at least a part of the graphene in the graphene heat-conducting foam is arranged in a direction perpendicular to a thickness direction of the graphene heat-conducting foam so as to form parallel layers close to surfaces of two sides of the graphene heat-conducting foam, respectively, and at least a part of the graphene is arranged along the thickness direction of the graphene heat-conducting film between the parallel layers, and this structure also provides a foundation for subsequently preparing a directionally-arranged graphene heat-conducting film.

As an optional embodiment of the present disclosure, at least a part of the graphene in the graphene heat-conducting foam is arranged in a direction perpendicular to a thickness direction of the graphene heat-conducting foam so as to form parallel layers close to surfaces of two sides of the graphene heat-conducting foam, respectively, and at least a part of the graphene is arranged along the thickness direction of the graphene heat-conducting foam between the parallel layers.

As an optional embodiment of the present disclosure, a thickness of the graphene heat-conducting foam is 0.01 to 100 mm;

as an optional embodiment of the present disclosure, a density of the graphene heat-conducting foam is 0.002-1.0 g/cm³; and as an optional embodiment of the present disclosure, the graphene heat-conducting foam has an in-plane thermal conductivity coefficient of 1-200 W/(m·K), and a longitudinal thermal conductivity coefficient of 1-10 W/(m·K).

The present disclosure further provides a preparation method of a directionally-arranged graphene heat-conducting film, including the following steps:

pressing the above directionally-arranged graphene heat-conducting foam to obtain the directionally-arranged graphene heat-conducting film.

This preparation method is convenient to operate and has strong controllability, the graphene heat-conducting film prepared by this preparation method has a unique structure, that is, at least a part of the graphene in the graphene heat-conducting film is arranged in a direction perpendicular to a thickness direction of the graphene heat-conducting film so as to form parallel layers close to surfaces of two sides of the graphene heat-conducting film, respectively, and at least a part of the graphene is arranged at an acute angle with the thickness direction of the graphene heat-conducting film between the parallel layers. The above structure makes the graphene heat-conducting film not only have a relatively high in-plane thermal conductivity coefficient, but also have a relatively high longitudinal thermal conductivity coefficient. It should be noted that, the graphene located between the parallel layers in the graphene heat-conducting film being arranged at an acute angle with the thickness direction of the graphene heat-conducting film may also be understood as that the graphene between the parallel layers and the parallel layers have a certain angle and are not arranged at a right angle. The longitudinal thermal conductivity coefficient may also be understood as a thermal conductivity coefficient along the thickness direction of the graphene heat-conducting film.

As an optional embodiment of the present disclosure, a pressing pressure is 10-200 MPa. A typical but non-limiting pressing pressure is 10 MPa, 20 MPa, 40 MPa, 50 MPa, 60 MPa, 80 MPa, 100 MPa, 120 MPa, 140 MPa, 150 MPa, 160 MPa, 180 MPa, or 200 MPa.

The present disclosure further provides a directionally-arranged graphene heat-conducting film, prepared by the above preparation method of a directionally-arranged graphene heat-conducting film.

In view of the specific steps of the above preparation method, the graphene heat-conducting film is allowed to have a unique structure, and the above unique structure enables the graphene heat-conducting film to not only have a relatively high in-plane thermal conductivity coefficient, but also have a relatively high longitudinal thermal conductivity coefficient.

As an optional embodiment of the present disclosure, a thickness of the graphene heat-conducting film is 0.005-1 mm. A typical but not non-limiting thickness of the graphene heat-conducting film is 0.005 mm, 0.01 mm, 0.02 mm, 0.05 mm, 0.08 mm, 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, or 1.0 mm.

As an optional embodiment of the present disclosure, a density of the graphene heat-conducting film is 1.0-2.3 g/cm³.

A typical but non-limiting density of the graphene heat-conducting film is 1.0 g/cm³, 1.2 g/cm³, 1.4 g/cm³, 1.5 g/cm³, 1.6 g/cm³, 1.8 g/cm³, 2.0 g/cm³, 2.2 g/cm³ or 2.3 g/cm³.

As an optional embodiment of the present disclosure, the graphene heat-conducting film has an in-plane thermal conductivity coefficient of 500-2000 W/(m·K), and a longitudinal thermal conductivity coefficient of 400-1500 W/(m·K).

A typical but non-limiting in-plane thermal conductivity coefficient of the graphene heat-conducting film is 500 W/(m·K), 800 W/(m·K), 1000 W/(m·K), 1200 W/(m·K), 1400 W/(m·K), 1500 W/(m·K), 1600 W/(m·K), 1800 W/(m·K), or 2000 W/(m·K), and a typical but non-limiting longitudinal thermal coefficient of the graphene heat-conducting film is 400 W/(m·K), 500 W/(m·K), 600 W/(m·K), 800 W/(m·K), 1000 W/(m·K), 1200 W/(m·K), 1400 W/(m·K), or 1500 W/(m·K).

The present disclosure further provides an electronic product, containing the above directionally-arranged graphene heat-conducting film.

In view of the advantages of the above directionally-arranged graphene heat-conducting film, the electronic product containing the directionally-arranged graphene heat-conducting film also has the same advantages.

The above graphene heat-conducting film can be applied to a variety of electronic products, including but not limited to 5G mobile terminals.

The present disclosure is further described below in combination with specific embodiments.

Embodiment 1

The present embodiment provides a preparation method of a directionally-arranged graphene heat-conducting foam, including the following steps:

(a) placing an array grid with a height of 2 mm and round microscopic through-holes with a diameter of 3 cm (specific structures are as shown in FIG. 1 and FIG. 2) in a tank with a height of 5 mm, directly injecting a part of a graphene oxide slurry with a solid content of 5% into the tank, until the height of the graphene oxide slurry was flush with the height of the array grid, subsequently placing the tank filled with the graphene oxide slurry in a freezing chamber to freeze, at a freezing temperature of −20° C., for freezing time of 3 h, taking out the tank when the graphene oxide slurry had no fluidity, and then directly drawing out the array grid, to obtain a first graphene oxide;

(b) injecting the other part of the graphene oxide slurry with a solid content of 5% into gaps left in the first graphene oxide after the array grid was taken out and an upper surface, until the height of the injected graphene oxide slurry was the same as the height of the tank, subsequently placing the tank filled with the graphene oxide slurry in the freezing chamber to freeze again, at a freezing temperature of −20° C., for freezing time of 2 h, taking out the tank when the graphene oxide slurry completely had no fluidity, placing the tank in a freeze-drier to freeze-dry at a temperature of −10° C. for 2 h, after completing the drying, taking out a graphene oxide film from the tank, to obtain a second graphene oxide; and (c) performing carbonization treatment on the second graphene oxide, wherein a temperature of the carbonization treatment was 1350° C., heat preservation time was 1.5 h, and a heating rate was 1° C./min, and then performing graphitization treatment, wherein a temperature of the graphitization treatment was 2900° C., heat preservation time was 10 h, and a heating rate was 0.8° C./min, to obtain a directionally-arranged graphene heat-conducting foam.

Embodiment 2

The present embodiment provides a preparation method of a directionally-arranged graphene heat-conducting foam, including the following steps:

(a) placing an array grid with a height of 50 mm and round microscopic through-holes with a diameter of 3 cm in a tank with a height of 100 mm, directly injecting a part of a graphene oxide slurry with a solid content of 5% into the tank, until the height of the graphene oxide slurry was flush with the height of the array grid, subsequently placing the tank filled with the graphene oxide slurry in a freezing chamber to freeze, at a freezing temperature of −20° C., for freezing time of 3 h, taking out the tank when the graphene oxide slurry had no fluidity, and then directly drawing out the array grid, to obtain a first graphene oxide;

(b) injecting the other part of the graphene oxide slurry with a solid content of 5% into gaps left in the first graphene oxide after the array grid was taken out and an upper surface, until the height of the injected graphene oxide slurry was the same as the height of the tank, subsequently placing the tank filled with the graphene oxide slurry in the freezing chamber to freeze again, at a freezing temperature of −20° C., for freezing time of 2 h, taking out the tank when the graphene oxide slurry completely had no fluidity, placing the tank in a freeze-drier to freeze-dry at a temperature of −5° C., after completing the drying, taking out a graphene oxide film from the tank, to obtain a second graphene oxide; and (c) performing carbonization treatment on the second graphene oxide, wherein a temperature of the carbonization treatment was 1400° C., heat preservation time was 1.2 h, and a heating rate was 2° C./min, and then performing graphitization treatment, wherein a temperature of the graphitization treatment was 2800° C., heat preservation time was 12 h, and a heating rate was 0.5° C./min, to obtain a directionally-arranged graphene heat-conducting foam.

Embodiment 3

The present embodiment provides a preparation method of a directionally-arranged graphene heat-conducting foam. Except that the solid content of a part of the graphene oxide slurry in step (a) was 2.3%, and the solid content of the other part of the graphene oxide slurry in step (b) was 2.3%, remaining steps and process parameters are the same as those in Embodiment 2.

Embodiment 4

The present embodiment provides a preparation method of a directionally-arranged graphene heat-conducting foam. Except that the solid content of a part of the graphene oxide slurry in step (a) was 10%, and the solid content of the other part of the graphene oxide slurry in step (b) was 10%, remaining steps and process parameters are the same as those in Embodiment 2.

Embodiment 5

The present embodiment provides a preparation method of a directionally-arranged graphene heat-conducting foam. Except that the freezing temperature was −80° C. and freezing time was 2 h in step (a), remaining steps and process parameters are the same as those in Embodiment 2.

Embodiment 6

The present disclosure provides a preparation method of a directionally-arranged graphene heat-conducting film, including a following step:

pressing the graphene heat-conducting foam manufactured in Embodiment 1, wherein a pressing pressure was 50 MPa, to obtain the directionally-arranged graphene heat-conducting film.

Embodiments 7-10

Embodiments 7-10 respectively provide a preparation method of a directionally-arranged graphene heat-conducting film, including a following step:

pressing the graphene heat-conducting foam manufactured in Embodiments 2-5, wherein a pressing pressure was 180 MPa, to obtain the directionally-arranged graphene heat-conducting film.

Embodiment 11

The present disclosure provides a preparation method of a directionally-arranged graphene heat-conducting film, including a following step:

pressing the graphene heat-conducting foam manufactured in Embodiment 2, wherein a pressing pressure was 10 MPa, to obtain the directionally-arranged graphene heat-conducting film.

Embodiment 12

The present disclosure provides a preparation method of a directionally-arranged graphene heat-conducting film, including a following step:

pressing the graphene heat-conducting foam manufactured in Embodiment 2, wherein a pressing pressure was 50 MPa, to obtain the directionally-arranged graphene heat-conducting film.

Comparative Embodiment 1

The present comparative embodiment provides an existing preparation method of a graphene heat-conducting foam, including the following steps:

coating a graphene oxide slurry with a solid content of 5% to obtain a graphene oxide film, then performing carbonization treatment on the graphene oxide film at a temperature of 1400° C., wherein heat preservation time was 1.2 h, and a heating rate was 2° C./min, and then performing graphitization treatment, wherein the temperature of the graphitization treatment was 2800° C., heat preservation time was 12 h, and a heating rate was 0.5° C./min, to obtain the graphene heat-conducting foam.

Comparative Embodiment 2

The present comparative embodiment provides an existing preparation method of a graphene heat-conducting film, including a following step:

pressing the graphene heat-conducting foam manufactured in Comparative Embodiment 1, wherein a pressing pressure was 50 MPa, to obtain the graphene heat-conducting film.

In order to compare the technical effects of various embodiments and comparative embodiments, the following experimental examples are specifically set.

Experimental Example 1

Figure 3:
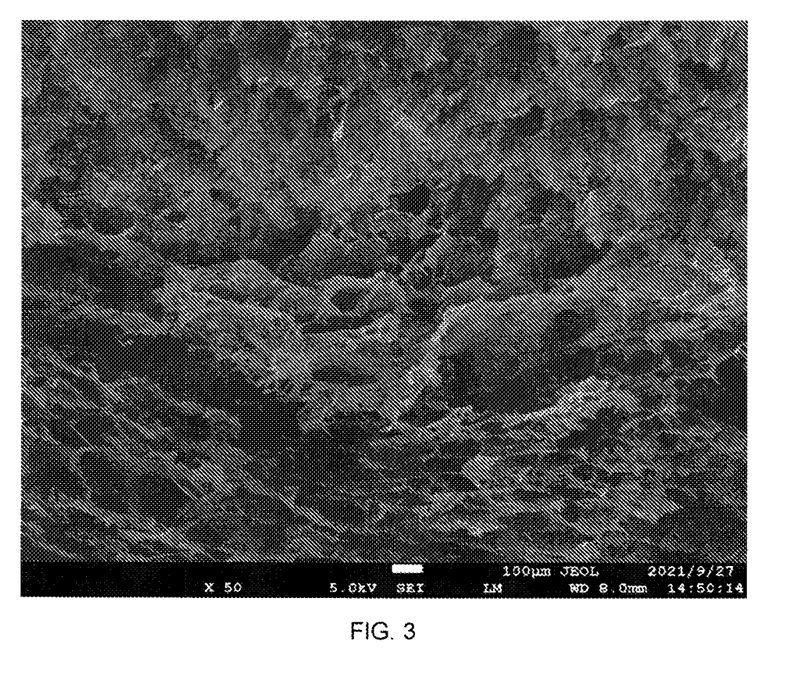
FIG. 3 is an electron micrograph of a graphene heat-conducting foam provided in Embodiment 1 of the present disclosure.
Figure 4:
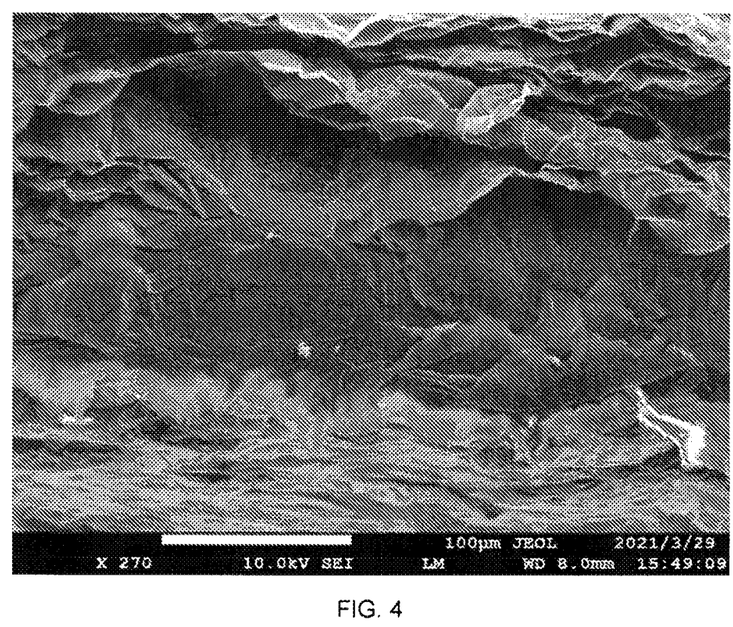
FIG. 4 is an electron micrograph of the graphene heat-conducting foam provided in Embodiment 2 of the present disclosure.
Figure 5:
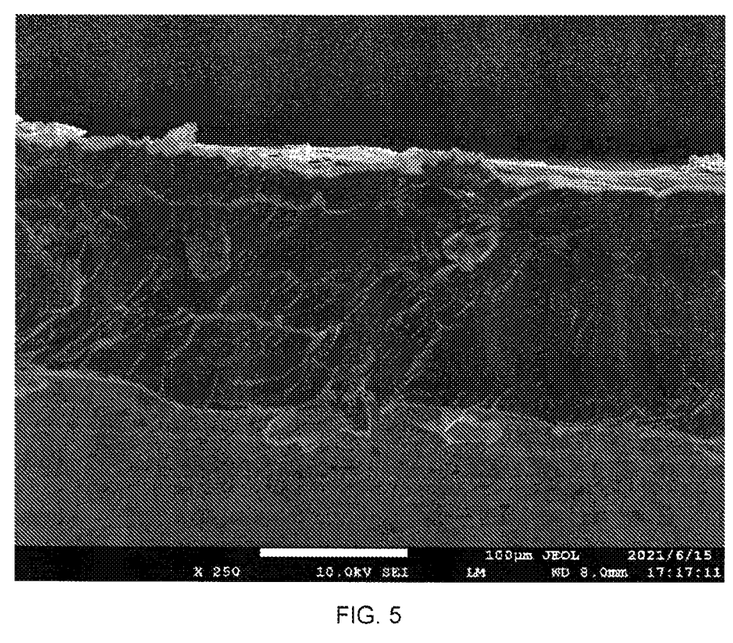
FIG. 5 is an electron micrograph of the graphene heat-conducting film provided in Embodiment 8 of the present disclosure.
Figure 6:
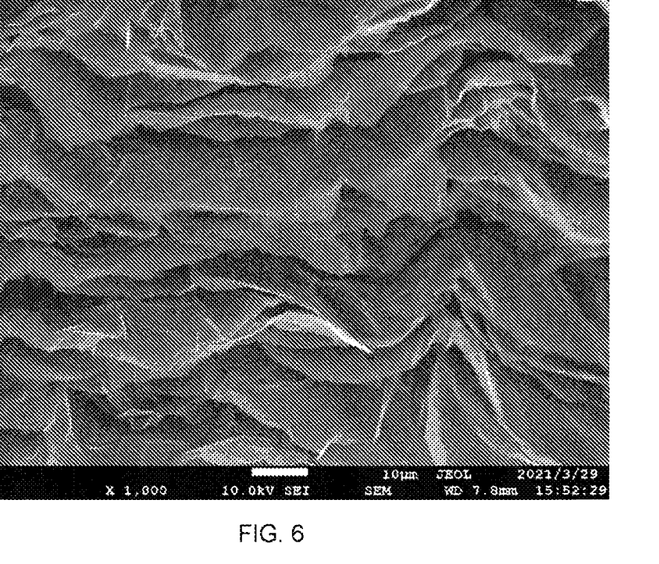
FIG. 6 is an electron micrograph of the graphene heat-conducting foam provided in Comparative Embodiment 1 of the present disclosure.
Figure 7:
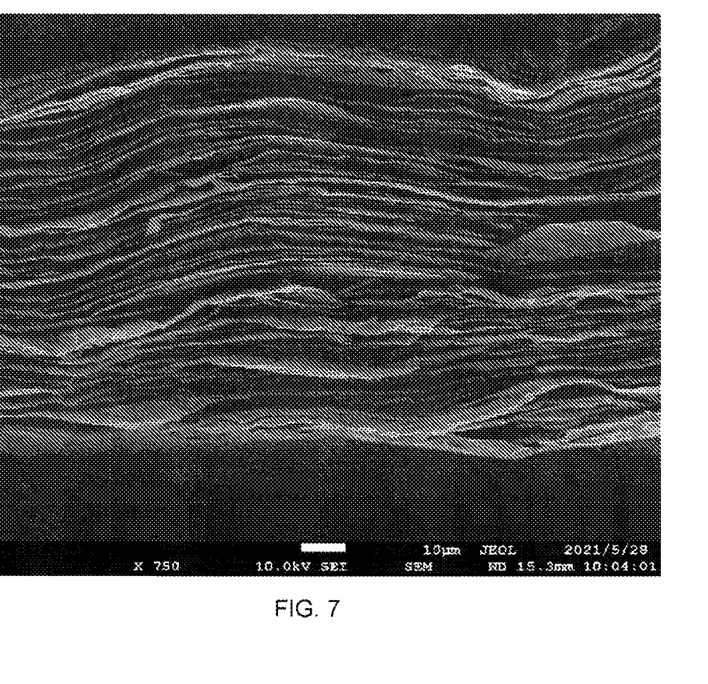
FIG. 7 is an electron micrograph of the graphene heat-conducting film provided in Comparative Embodiment 2 of the present disclosure.

(1) Taking Embodiment 1, Embodiment 2, Embodiment 8, Comparative Embodiment 1, and Comparative Embodiment 2 as representatives, electron microscopy scanning was performed on the graphene heat-conducting foams or the graphene heat-conducting films provided therein, and specific results are shown in FIG. 3 to FIG. 7. FIG. 3 is an electron micrograph of the graphene heat-conducting foam provided in Embodiment 1, FIG. 4 is an electron micrograph of the graphene heat-conducting foam provided in Embodiment 2, FIG. 5 is an electron micrograph of the graphene heat-conducting foam provided in Embodiment 8, and FIG. 6 and FIG. 7 are electron micrographs of the graphene heat-conducting foam and the graphene heat-conducting film provided in Comparative Embodiment 1 and Comparative Embodiment 2 of the present disclosure.

It can be seen from FIG. 3 to FIG. 5 that, the graphene heat-conducting foam provided in the present disclosure is formed with parallel layers close to surfaces of two sides of the graphene heat-conducting foam, respectively, and graphene between the parallel layers is arranged along a thickness direction of the graphene heat-conducting foam. The graphene heat-conducting film formed by pressing the graphene heat-conducting foam of the present disclosure also presents a similar morphology, that is, parallel layers are formed near surfaces of two sides of the graphene heat-conducting film, respectively, and graphene between the parallel layers is arranged at an acute angle with the thickness direction of the graphene heat-conducting film. It may also be understood that, in the present disclosure, the graphene between the parallel layers of the graphene heat-conducting foam is arranged along a direction perpendicular to or nearly perpendicular to the parallel layers, while the graphene between the graphene heat-conducting films of the present disclosure is arranged at an acute angle (obliquely and non-perpendicularly) with the parallel layers.

It can be seen from FIG. 6 and FIG. 7 that the graphene heat-conducting foam or the graphene heat-conducting film manufactured by the existing preparation method only had a single layered structure, and does not have the above specific structure of the present disclosure. The above structures of Comparative Embodiment 1 and Comparative Embodiment 2 also determine that they have a certain transverse thermal conductivity but poor longitudinal thermal conductivity.

(2) The thickness, density, in-plane thermal conductivity coefficient, and longitudinal thermal conductivity coefficient of the graphene heat-conducting foam and the graphene heat-conducting film provided in various embodiments and comparative embodiments were detected.

The thicknesses of the graphene heat-conducting foam and the graphene heat-conducting film were measured according to ASTM D374. The densities of the graphene heat-conducting foam and the graphene heat-conducting film were measured according to GB/T 13542.2-2009. The in-plane thermal conductivity coefficient and the longitudinal thermal conductivity coefficient of both the graphene heat-conducting foam and the graphene heat-conducting film were measured according to ASTM E1461-2014. Specific details are as shown in Table 1.

TABLE 1

| Experiment Group | Mean thickness (mm) | Mean density (g/cm$^3$) | Mean in-plane thermal conductivity coefficient (W/(m · K)) | Mean longitudinal thermal conductivity coefficient (W/(m · K)) |
| --- | --- | --- | --- | --- |
| Embodiment 1 | 4 | 0.009 | 6.12 | 5.36 |
| Embodiment 2 | 80 | 0.011 | 5.90 | 5.10 |
| Embodiment 3 | 76 | 0.005 | 2.89 | 2.76 |
| Embodiment 4 | 90 | 0.018 | 8.89 | 8.72 |
| Embodiment 5 | 80 | 0.010 | 5.36 | 4.68 |
| Embodiment 6 | 0.018 | 2.10 | 1993 | 1354 |
| Embodiment 7 | 0.39 | 2.26 | 1212 | 1023 |
| Embodiment 8 | 0.17 | 2.21 | 1625 | 1127 |
| Embodiment 9 | 0.73 | 2.24 | 1106 | 453 |
| Embodiment 10 | 0.35 | 2.27 | 1323 | 997 |
| Embodiment 11 | 0.64 | 1.20 | 696 | 678 |
| Embodiment 12 | 0.46 | 1.83 | 965 | 887 |
| Comparative Embodiment 1 | 0.60 | 0.3 | 165 | 1.8 |
| Comparative Embodiment 2 | 0.0010 | 2.0 | 1250 | 5.6 |

It can be seen from the data in Table 1 that by pressing, the thickness and density of the graphene heat-conducting film can be increased, and both the in-plane thermal conductivity coefficient and the longitudinal thermal conductivity coefficient are increased. The graphene oxide slurry has a low concentration, and the graphene heat-conducting film finally obtained is relatively thin, but the thermal conductivity coefficient is also the highest. However, comparing the in-plane heat conduction and the longitudinal heat-conducting performance, for the same sample and synthesis process, without the pressing process, the longitudinal heat conduction is substantially equal to the in-plane heat conduction. After the pressing, the longitudinal heat conduction is lower than the in-plane heat conduction, which is mainly caused by that the vertical graphene sheets are pleated during the pressing.

Finally, it should be noted that various embodiments above are merely used for illustrating the technical solutions of the present disclosure, rather than limiting the present disclosure; although the detailed description is made to the present disclosure with reference to various preceding embodiments, those ordinarily skilled in the art should understand that they still could modify the technical solutions recited in various preceding embodiments, or make equivalent substitutions to some or all of the technical features therein; and these modifications or substitutions do not make the corresponding technical solutions essentially depart from the scope of the technical solutions of various embodiments of the present disclosure.

What is claimed is:

1. A preparation method of a directionally-arranged graphene heat-conducting foam, comprising steps of:
    (a) injecting a part of a graphene oxide slurry into a tank containing an array grid, and taking out the array grid from the tank when the graphene oxide slurry is frozen to have no fluidity, to obtain a first graphene oxide;
    (b) injecting the other part of the graphene oxide slurry into gaps left in the first graphene oxide after the array grid is taken out and an upper surface, freezing the graphene oxide slurry again until the graphene oxide slurry has no fluidity, and then drying to obtain a second graphene oxide; and
    (c) performing carbonization and graphitization treatment on the second graphene oxide, to obtain a directionally-arranged graphene heat-conducting foam.

2. The preparation method according to claim 1, wherein in step (a), the array grid is provided with several microscopic through-holes, a bottom surface of the array grid has a certain distance from a bottom surface of the tank, and the microscopic through-holes can make the graphene oxide slurry pass through and flow to a bottom of the tank.

3. The preparation method according to claim 1, wherein in step (a), a height of the tank is greater than or equal to a height of the array grid.

4. The preparation method according to claim 1, wherein in step (a), a solid content of the part of the graphene oxide slurry is 0.1-10%.

5. The preparation method according to claim 4, wherein in step (a), the solid content of the part of the graphene oxide slurry is 5%.

6. The preparation method according to claim 1, wherein in step (a), a freezing temperature is −5~−150° C., and freezing time is 1-3 h.

7. The preparation method according to claim 1, wherein in step (b), a solid content of the other part of the graphene oxide slurry is 0.1-10%.

8. The preparation method according to claim 7, wherein in step (b), the solid content of the other part of the graphene oxide slurry is 5%.

9. The preparation method according to claim 1, wherein in step (b), a re-freezing temperature is −5~−150° C., and re-freezing time is 1-3 h.

10. The preparation method according to claim 1, wherein in step (c), a temperature of the carbonization treatment is 1000-2000° C., a heat preservation time is 1-2 h, and a heating rate is 1-5° C./min.

11. The preparation method according to claim 1, wherein in step (c), a temperature of the graphitization treatment is 2300-3300° C., a heat preservation time is 4-20 h, and a heating rate is 0.5-1° C./min.

12. A preparation method of a directionally-arranged graphene heat-conducting film, comprising a step of:
    pressing the directionally-arranged graphene heat-conducting foam by the preparation method according to claim 11 to obtain the directionally-arranged graphene heat-conducting film.

13. The preparation method according to claim 12, wherein a pressing pressure is 10-200 MPa.

* * * * *